3,088,822
PRODUCTION OF URANIUM METAL
James Elgie Lloyd and Donald Duxbury, Lea, Preston, England, assignors to United Kingdom Atomic Energy Authority, London, England
No Drawing. Filed Jan. 20, 1960, Ser. No. 3,496
Claims priority, application Great Britain Jan. 22, 1959
2 Claims. (Cl. 75—84.1)

This invention relates to the production of uranium metal by the reduction of uranium tetrafluoride.

In British Patent 780,974 there is described a process for the production of uranium by the reduction of uranium tetrafluoride using magnesium metal as the reducing agent. In this process a mixture of the reactants, namely uranium tetrafluoride powder and magnesium raspings is compacted into pellets. The compacted pellets are loaded into a reaction vessel capable of withstanding the pressure generated during the reaction and lined with a suitably inert substance such as graphite or sintered magnesium fluoride. The reaction vessel and contents are loaded into a furnace heated to a temperature in the range 800° C.–1000° C. Argon is bled into the reaction vessel at a pressure of 3–4 lbs. above atmospheric and the heating of the furnace maintained until the reaction is initiated.

The present invention relates to a modification of the above process whereby the uranium metal obtained is improved in respect of general cleanliness and slag inclusion etc.

According to the present invention in the production of uranium metal by reduction of uranium tetrafluoride with magnesium metal the reactants are compacted to raise the bulk density of the charge and the compacted reactants are heated in a reaction vessel to the temperature of initiation of the reaction in at least two consecutive stages, first heating to a temperature below the initiation temperature whilst evacuating the reaction vessel and second continuing the heating under a blanket of inert gas to the initiation temperature.

In one particular example of the process (using a reactor and reactants as described in British Patent 780,974) the rate of heating is controlled so that initiation of the reaction is anticipated to take place 110 minutes from the commencement of heating of the reaction vessel. For the major part of the period from the commencement of heating (e.g. for the first 90 minutes) it is arranged that heating takes place with continuous evacuation to a pressure of less than 1 cm. of mercury. For the remainder of the period up to initiation of the reaction (e.g. the last 20 minutes) argon is admitted to the reaction vessel at 3–4 lbs. above atmospheric pressure. A temperature in the range 400–450° C. is reached when the evacuation is stopped that is between 200 and 250° C. below the initiation temperature (650° C.) of the reaction.

In another example of the process (also using a reactor and reactants as described in British Patent 780,974) the rate of heating is controlled so that initiation of the reaction is anticipated to take place 90 minutes from the commencement of heating the reaction vessel. Again for the major part of the period from the commencement of the heating (e.g. for the first 70 minutes) it is arranged that heating takes place with continuous evacuation to a pressure of less than 1 cm. of mercury. For the remainder of the period up to initiation of the reaction (e.g. for the last 20 minutes) argon is admitted to the reaction vessel at 10–15 lbs. above atmospheric pressure.

The use of the evacuation heating stage and the higher argon pressures (10–15 lbs. above atmospheric) results in an improved reaction efficiency and incidentally produces an improvement in the life of the graphite which is used to line the reaction vessel. This improvement in the graphite life is due to the fact that there is less chemical attack on the graphite and that splashing of liquid slag and metal during the reaction is reduced. Such splashing causes cementing together of the components of the graphite lining adding to the difficulty of breaking down the furnace between reductions and resulting in high graphite breakage.

We claim:
1. In the production of uranium metal by the reduction of uranium tetrafluoride with magnesium metal, the steps of heating a compacted charge of the reactants in a reaction vessel to a temperature below the reaction initiation temperature while evacuating the vessel, and continuing heating of the charge to said reaction initiation temperature under a blanket of inert gas at a pressure of about 10–15 pounds above atmospheric pressure.

2. A process for the production of uranium metal as claimed in claim 1 wherein the first stage of heating the reactants in the reaction vessel while evacuating the vessel occupies the major part of the total heating period up to initiation of the reaction.

References Cited in the file of this patent
FOREIGN PATENTS
780,974    Great Britain _____ Aug. 14, 1957